S. ALEXANDER.
FOOT PROTECTOR FOR SHOE WEARING ANIMALS.
APPLICATION FILED MAY 4, 1914.
1,129,774.
Patented Feb. 23, 1915.
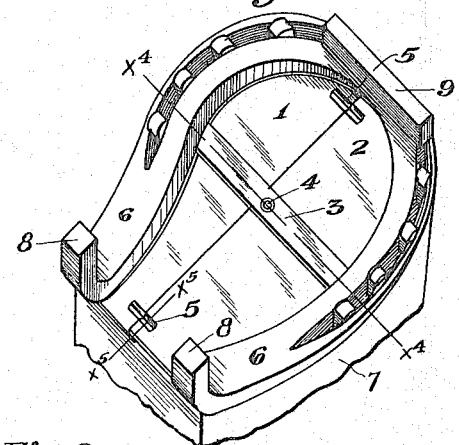
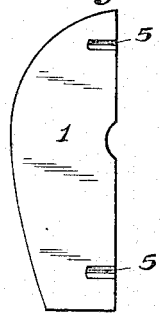
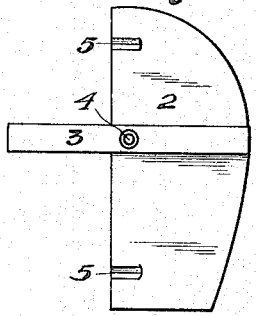
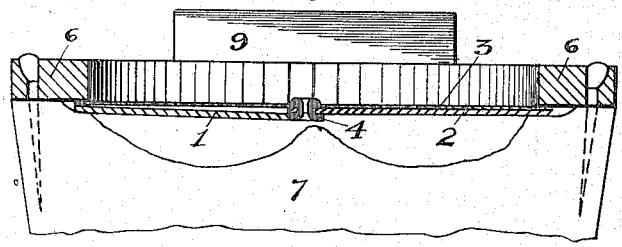
Witnesses,
Percy Hight
J. D. Haskin
Inventor,
Solomon Alexander,
By
His Attorney

UNITED STATES PATENT OFFICE.

SOLOMON ALEXANDER, OF LONG BEACH, CALIFORNIA, ASSIGNOR OF ONE-HALF TO OLIVER C. MITCHELL, OF LONG BEACH, CALIFORNIA.

FOOT-PROTECTOR FOR SHOE-WEARING ANIMALS.

1,129,774.  Specification of Letters Patent.  Patented Feb. 23, 1915.

Application filed May 4, 1914. Serial No. 836,379.

*To all whom it may concern:*

Be it known that I, SOLOMON ALEXANDER, a citizen of the United States, residing at Long Beach, in the county of Los Angeles and State of California, have invented a new and useful Foot-Protector for Shoe-Wearing Animals, of which the following is a specification.

My invention relates to improvements in foot protectors for shoe wearing animals, and the object of my invention is to provide a device for protecting the tender portion of the feet of animals, for holding remedies in contact with the feet in case of sores or disease and for preventing foreign substances from lodging in the hoof and causing sores.

Other objects may appear in the subjoined detail description.

I attain this object by means of the mechanism illustrated in the accompanying drawings, in which—

Figure 1 is a perspective view of my device in position on an animal's foot; Fig. 2 is a plan of the left hand member; Fig. 3 is a plan of the right hand member; Fig. 4 is a section on the line $x^4$—$x^4$, Fig. 1 showing a portion of the hoof and the shoe inverted; Fig. 5 is a fragmentary section on the line $x^5$—$x^5$, Fig. 1 showing the locking grooves.

Similar numerals of reference indicate the same parts throughout the specifications and the several views of the drawings.

My device is composed of only three elements, the plate 1, the plate 2 and the resilient locking member 3, the latter of which is pivoted to the plate 2 by means of the riveted eye 4. The plate 2 is slightly wider than the plate 1 but has a similar shape, each of the plates 1 and 2 being provided with the depressions 5 which are formed in the plates near each end, and the depressions on each of the plates are adapted to register with each other. The two plates 1 and 2 are adapted to conform to the contour of the hoof of an animal and the shoe adapted to be nailed thereon, and the inner edges of the plates overlap, as shown in Fig. 1, when they are in position between the shoe 6 and the hoof 7. Ordinarily, the bearing surface of a shoe is restricted to points under the extensions 8 and 9 of the shoe and around the outer edge thereof, so that a clearance is provided between the inner edge of the shoe and the hoof, and my protector being constructed of the thin metal plates 1 and 2, is adapted to engage the space between the shoe and the hoof.

When it is desired to insert the protector in position, the plate 1 may be first inserted and then the plate 2, when the locking member 3 may be turned on its pivot until the ends thereof engage the space between the shoe and the plates 1 and 2, and the plates thus, will be held resiliently in position. The grooves 5 will be engaged by the projections formed by the grooves on the other plate, and the inner ends of the plates being larger than the outer ends, the plates will thus be prevented from accidental withdrawal. An adjustment of the plates 1 and 2, laterally, may be had by moving them inwardly, thus changing the lateral relationship of the interlocking grooves 5.

My protector is designed primarily as a means of closing the tender portion of the foot near the center of the hoof against contact with foreign substances, and when an animal has sore feet, for holding remedies in position against the sores. The remedies may be applied by saturating gauze or cotton, and they may be held in the proper position by the plates 1 and 2, and a cure of any disease, thus more readily accomplished.

While the primary use of my device is for remedial purposes, the device may be successfully and ordinarily used as a preventive against sore feet, as it is obvious that no substances may come in contact with the tender portion of the feet when the plates are in position, though it is of course possible that when an animal is being driven on extremely rough ground, the plates may become loosened and thrown out of their proper position.

The plates 1 and 2 may be adapted to any shape of shoe and any size foot, and it is possible that a few minor changes in the form may be made to suit the device to general use, but it is thought that the form shown will generally suit the majority of conditions.

Having thus described my invention, what I claim as new and desire Letters Patent for, is:

1. A foot protector for shoe wearing animals comprising a pair of similar plates adapted to engage the space between the inner portion of the shoe and the hoof, said plates having a pair of interlocking grooves adapted to engage and hold said plates against longitudinal movement, and one of said plates having a resilient and pivoted locking member adapted to hold the plates against lateral movement.

2. In a device of the character described, the combination of a pair of overlapping and interlocking plates adapted to conform to the shape of an animal's hoof and shoe, each of said plates having a pair of grooves formed therein, the grooves on one of said plates adapted to register with those on the other plate; and a locking member pivoted to one of said plates and adapted to engage the lower side of the shoe and the outer edges of said plates, for holding said plates resiliently in position.

3. In a device of the character described, the combination of a pair of similar metallic plates conforming in shape to the hoof of an animal, adapted to be secured in position between the hoof and shoe and when in such position to overlap at their inner edges; a resilient locking bar pivotally secured to one of said plates whose ends are adapted to be secured between the plates and the shoe for holding the plates firmly in position; and a pair of interlocking grooves formed on the inner edges of said plates for preventing a longitudinal movement of said plates and for affording lateral adjustment therefor.

4. In a device of the character described, the combination with a shoe, of a pair of overlapping plates adapted to be secured between said shoe and the hoof of an animal and conforming in shape to said hoof; a locking bar pivotally secured to one of said plates adapted to lock between said shoe and said plates, said plates being provided on their inner sides with a pair of interlocking grooves for preventing a longitudinal movement of the plates and for affording a lateral adjustment therefor.

SOLOMON ALEXANDER.

Witnesses:
  MAY A. BURNS,
  A. H. SMITH.

Copies of this patent may be obtained for five cents each, by addressing the "Commissioner of Patents, Washington, D. C."